United States Patent [19]
Glotfelter et al.

[11] Patent Number: 5,023,140
[45] Date of Patent: Jun. 11, 1991

[54] FLOOR COVERING HAVING A MODIFIED GLASS WEAR LAYER

[75] Inventors: Craig A. Glotfelter, Lancaster; Robert P. Ryan, Parkesburg, both of Pa.

[73] Assignee: Armstrong World Industries, Inc., Lancaster, Pa.

[21] Appl. No.: 209,097

[22] Filed: Jun. 20, 1988

[51] Int. Cl.$^5$ .......................... B32B 27/38; B32B 9/00
[52] U.S. Cl. ..................................... 428/413; 428/429; 428/442; 428/447
[58] Field of Search ................ 428/429, 413, 440, 447

[56]  References Cited
U.S. PATENT DOCUMENTS

| | | | |
|---|---|---|---|
| 3,811,918 | 5/1974 | Leven | 117/47 H |
| 4,346,131 | 8/1982 | Yoldas | 428/35 |
| 4,480,072 | 10/1984 | Mallon | 525/61 |
| 4,666,762 | 5/1987 | Yamamoto | 428/908.8 |
| 4,731,264 | 3/1988 | Lin et al. | 427/387 |

FOREIGN PATENT DOCUMENTS 0222582 5/1987 European Pat. Off. .
2177093A 1/1987 United Kingdom .

OTHER PUBLICATIONS

Dr. Helmut Dislich, "Sol-Gel Derived Dip Coatings", pp. 261-268.
H. K. Schmidt, "Organically Modified Silicates as Inorganic-Organic Polymers", pp. 102-103.
Chemical Abstract 107:178273g, Hiroshi Hosono, "Antifogging Coatings", Aug. 14, 1987, p. 18 of CA Selects: Coatings, Inks, & Related Products, Issue 23, 1987.

Primary Examiner—Patricia C. Sluby

[57] ABSTRACT

A 1 to 8 micron organic/inorganic (epoxy/glass) wear surface coating over a clear, protective layer provides excellent stain and gloss protection. An acid hydrolyzed silicate is combined with an acid hydrolyzed silicone coupling agent; an epoxy monomer; a photoinitiator and silicon oil surfactant to produce a coating composition which is dried to remove alcohol/water solvent and U.V. cured.

24 Claims, No Drawings

FLOOR COVERING HAVING A MODIFIED GLASS WEAR LAYER

FIELD OF THE INVENTION

The present invention relates to coating compositions. More particularly, the invention relates to a novel epoxy/glass coating composition which provides stain and gloss protection when applied over a clear, protective layer.

BACKGROUND OF THE INVENTION

From the mid-1940's it was known that metal alkoxide could be hydrolyzed and condensed to form glasses. Subsequently, from about the mid-1970's it was known that silica could be produced in situ as a chemical product of compounds such as tetraethylorthosilicate (TEOS).

It was previously known from U.S. Pat. No. 3,811,918, to partially acid hydrolyze silicon alkoxide and add metal oxide to prepare a glass precursor which could be fired to a glass composition at a temperature above 1000° C. Further, U.S. Pat. No. 4,346,131 describes the preparation of a clear alcohol solution of acid hydrolyzed metal alkoxide which can be coated on a substrate and dried to produce an optical coating.

Silane coupling agents as disclosed in U.S. Pat. No. 4,480,072 provided a useful means to cross-link organic and inorganic surfaces and particles.

An article on SOL-GEL DERIVED DIP COATINGS by Helmut Dislich of Schott Glaswerke, Hattenbergstr. 10, 6500 Mainz, Federal Republic of Germany, discloses how mixtures of metal alkoxides may be used to condense mixed metal on a glass surface such as silicon-titanium, aluminum-magnesium, cadmium-tin, indium-tin, etc. An article on ORGANICALLY MODIFIED SILICATES AS INORGANIC-ORGANIC POLYMERS by H. K. Schmidt of Fraunhofer-Institut fur Silicatforschung, Wurzburg, Federal Republic of Germany, describes combinations of linear organic polymer networks with three dimensional tetrahedron silicon networks using the sol-gel process, e.g. where combined polymerization of methacrylate and condensation of $Ti(OR)_4/Si(OR)_4/epoxy-Si(OR)_3$ produce a reinforced system with increased tensile strength and scratch resistance.

Japanese Application 86/25,739 discloses antifogging tile coatings where silica is bonded to polyvinyl alcohol using hydrolyzed [3-(glycidyloxy)-propyl] trimethoxysilane.

European Patent Application 222,582 discloses an ultraviolet curable composition with good adhesion to glass comprising epoxy resin, poly-organosiloxane, aromatic onium salt and acrylate resin.

British Patent Application GB 2,177,093 covers an ultraviolet curable coating composition comprising multifunctional glycidyl or cycloaliphatic epoxy oligomer, hydrolyzed silane coupling agent treated inorganic filler and photoinitiator for reaction of epoxy groups.

Still, in spite of all the known art and available compositions of matter, a need existed to provide protective wear surfaces which could be conveniently produced without adverse environmental effects.

Summary of the Invention

A protective coating composition having improved stain resistance and gloss retention suitable for coating wear surfaces comprises
 (a) an acid hydrolyzed silicate;
 (b) an acid hydrolyzed epoxy/silane coupling agent;
 (c) a difunctional monomer; and
 (d) a photoinitiator.

A preferred composition comprises
 (a) about 10 to about 70% of an acid-catalyzed hydrolysis product of at least one silicate selected from the group of tetramethylorthosilicate (TMOS), tetraethylorthosilicate (TEOS) or tetrapropylorthosilicate (TPOS);
 (b) about 1 to about 70% acid-catalyzed epoxy/silane coupling agent;
 (c) about 1 to about 70% of an difunctional, cycloaliphatic epoxy monomer having at least one cyclohexene oxide functionality;
 (d) about 0.5 to about 10% of an photoinitiator capable of initiating ring-opening, cationic photopolymerization of (c); and
 (e) about 0.1 to about 1% of an poly(dimethylsiloxane) surfactant, wherein the cured coating has a MOHS hardness greater than 1.5.

A method for preparing a protective coating comprises
 (a) combining acid hydrolyzed solutions of
  (i) a metal alkoxide solution having a pH of about 4 or less;
  (ii) an epoxy/silane coupling agent solution having a pH of about 4 or less;
 (b) adding a difunctional cycloaliphatic epoxy monomer to the hydrolyzed solution;
 (c) applying the composition in a thickness ranging between about 1 and about 8 microns over a clear, protective layer bonded to a substrate;
 (d) drying the composition to remove solvent; and
 (e) curing the composition. Preferably, the protective layer is bonded to a substrate comprising resilient tile, or flooring. Clear, protective layers are standard in this industry, but polyester, polyacrylate, and acrylated urethane types have been found to be particularly suitable.

The coating may be cured by any suitable means including heat or ultraviolet light irradiation.

DETAILED DESCRIPTION OF THE INVENTION

The hardness and durability of ceramics has long made them a desirable surface for both wall and floor applications. The best ceramics have MOHS hardness ratings of 8 and above. Unfortunately, all traditional ceramics with high MOHS hardnesses require, as part of their processing, a firing step during which temperatures of 800° C. and above are the norm. To create a ceramic surface on a typical floor substrate such as vinyl tile, then, would seem to be highly improbable.

Yet in spite of the difficulty perceived, the present invention provides a polymer/glass hybrid coating based on sol-gel technology that has outstanding physical properties, for example, on vinyl-based flooring substrates.

The sol-gel process embodies the phase transformation of a colloidal dispersion (or sol) of a metal oxide to a gel. The metal oxide gel can then be dried to form the corresponding glass as indicated by Formula (1).

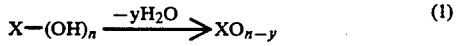

(1)

wherein X=Si, Ti, Al...

Methods of accomplishing the sol-gel transformation include dispersion of a fine particulate metal oxide (e.g. silica) in an aqueous acidic solution, neutralization of an acidic metal salt solution (e.g. indium nitrate in nitric acid), neutralization of an alkali metal silicate with acid (e.g. sodium silicate), and the hydrolysis/condensation reaction of a metal alkoxide or halide (e.g. tetraethylorthosilicate or tetrachlorosilane).

Sol-gel processing of metal oxides is of particular importance because with varying reaction conditions the control of particle size in gels is possible (optical clarity), the composition of the final glass can be easily varied (toughened glasses e.g. borosilicate, zirconia/silica), and polymer species can be introduced in solution to achieve hybrid inorganic/organic materials.

Generally, any of the metal alkoxides based upon Al, Zr, Si, or Ti will readily form oxides after hydrolysis and removal of solvent as indicated by Formula (2).

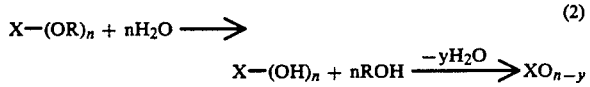

(2)

where X=Si, Ti, Zr, Al...

Typically, the hydrolysis/condensation reactions of metal alkoxides are run using a stoichiometric amount of water and at a pH of about 2. This procedure works well for the silicon and aluminum alkoxides but other alkoxides such as zirconium and titanium require a very low pH or slow hydrolysis reactions to maintain a reasonable stability. Those alkoxides forming stable gels at low pH are otherwise unsuitable for inorganic/organic hybrid systems due to the reactivity of the monomer/polymer portion of the system.

Many alkoxides, when hydrolyzed, immediately condense to form macroscopic metal oxide particles.

Zirconium and titanium alkoxides exhibit this behavior if the pH of the system is not sufficiently low. Silicon and aluminum alkoxides, however, are able to be hydrolyzed at pH's of 2-5 and remain stable for relatively long periods of time.

The term polymerization is often used in sol-gel processing to describe the transformation of the sol phase to the gel/glass phase since glass is a polymer. However, it is probably more correct to think of the gel-to-glass conversion as an aggregation step during which discrete oxide particle of small size (in the range of 4 nm for acid catalyzed silicon alkoxides) form and are chemically bonded to one another. This contrasts with the molecular polymerization concept where each functional group is reacted to form either a linear or three dimensional network.

Glasses prepared from acid-catalyzed sol-gel process form clear, hard films due to the extremely small sizes of the aggregated oxide particles and in thin films (150 nm), sol-gel derived glasses can rival the performance of traditional glasses. Silicon alkoxides are by far the easiest alkoxides from which such glasses can be formed. Using metal halides has the disadvantage of acid generation during the hydrolysis step. Alkoxides such as tetraethylorthosilicate (TEOS) and tetramethylorthosilicate (TMOS) are readily hydrolyzed at pH 2 and condense upon evaporation of solvent to give approximately 90% yield pure silica as determined by IR (powder dried 2 hrs. 150° C.) If the hydrolysis product is left in solution and the solution sufficiently concentrated, a gel will form in 24-72 hours.

The present invention provides a hybrid coating based on a cycloaliphatic epoxy and a silicon alkoxide. Typically, the coatings have a "MOHS" hardness rating of 1.5-4. While falling short of the "MOHS" hardness of ceramic surfaces, the hybrid coating represents an increase in hardness compared to normal "hard" polymers (e.g. PMMA has a "MOHS" hardness of 1.50). In fact, it has been a surprising result to find that 0.5 to 8 micron coatings of the present invention have stain resistance and wear retention rivaling ceramic tile.

Thus, when applied to a flooring structure consisting of either a tile or resilient base and an intermediate layer of a U.V. curable clear, transparent layer, a 1-2 micron coating of the invention greatly enhances the wear properties of currently available flooring wear surfaces when applied via a spray or dip process.

The general scheme for producing a polymer/glass hybrid is: (1) preparation of a hydrolyzed metal alkoxide in solution (acid catalyzed), (2) preparation of a hydrolyzed coupling agent (i.e. bifunctional having one trialkoxysilane functionality and one organic functionality) in solution (acid catalyzed), and after mixing the above, (3) inclusion of a photopolymerizable monomer (either free-radical or cationically initiated, (4) inclusion of an appropriate photoinitiator, (5) inclusion of a surfactant, (6) coating on a clear, protective layer (7) drying, and (8) ultraviolet exposure.

Tetramethylorthosilicate (TMOS), tetraethylorthosilicate (TEOS) and tetrapropylorthosilicate (TPOS) are the preferred silicates for acid hydrolysis at a pH of 4 or below. Triethylborate (TEB) or boric acid may be substituted for the TMOS, TEOS or TPOS in amounts from 0.25 to 1.5% by weight of TMOS, TEOS or TPOS in order to increase the useful lifetime of the coating solution. While other metal alkoxides might not be as convenient to use, they nevertheless could be employed to vary the properties of the wear surface protective coating within the practice of the present invention as long as they are compatible with the sol-gel process.

There are a number of commercially available silane coupling agents with polymerizable functional groups. Acrylates, methacrylates and epoxides are available as well as amino-functional silanes capable of polymerizing epoxide resins.

Epoxy functional coupling agents perform best when they incorporate a trifunctional alkoxysilane. While it is not critical if the epoxy silane is either a glycidyl ether or cycloaliphatic oxide type, a preferred coupling agent is 3-glycidoxyproryltrimethoxy silane.

Epoxy monomers which were found to be useful within the present invention include:

| Epoxy | Manufacturer | Chemical Name | Trade Name Equivalents |
| --- | --- | --- | --- |
| ERL-4221 | Union Carb. | 3,4-epoxycyclohexyl-3,4-epoxycyclohexane carboxylate | CY-179 (Ciba-Geigy) |
| ERL-4299 | Union Carb. | Bis(3,4-epoxy-6-methyl cyclohexyl) adipate | CY-178 (Ciba-Geigy) |
| ERL-4201 | Union Carb. | 3,4-epoxy-6-methyl cyclohexanmethyl-3,4-epoxy-6-methyl cyclohexane carboxylate | — |

| Epoxy | Manufacturer | Chemical Name | Trade Name Equivalents |
|---|---|---|---|
| ERL-4206 | Union Carb. | Vinylcyclohexenedioxide | RD-4 (Ciba-Geigy) |
| DECO | Aldrich | 1,2,5,6-diepoxy cyclooctane | — |

On the other hand, epoxy monomers which were found to be incompatible with the present invention include:

| MK-107 | Wilmington Chemical | Cyclohexenedimethanol diglycidyl ether | |
|---|---|---|---|
| Heloxy 68 | Wilmington Chemical | Neopentyl glycol diglycidyl ether | |
| DER 331 | Dow Chemical | Diglycidyl ether of bisphenol A | |
| DEN 438 | Dow Chemical | Polyglycidyl ether of phenol-formaldehyde novolac | |
| EPN 1139 | Ciba-Geigy | Novolac | |

While it is not known with any degree of certainty, it is believed that cycloaliphatic oxide functionality must predominate over glycidyl ether functionality in order for the epoxy monomer to produce the hybrid system of the present invention.

A particularly useful epoxide is ERL-4221 available from Union Carbide with the structural formula:

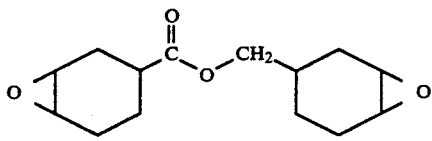

It has been discovered that a vinyl monomer such as triethylene glycol divinyl ether can also provide excellent gloss protection and stain resistance equivalent to the preferred epoxy monomers.

Acrylate or vinyl monomers such as described in U.S. Pat. Nos. 2,760,863; 2,791,504; 2,927,022; 3,261,686; or 3,380,831 may be employed solely or in combination with epoxy monomers depending on the degree of hardness desired for the protective coating. Mixtures of monomers may necessitate having mixtures of photoinitiators for both types of polymerization. For epoxy polymerization there are commercially available photoinitiators which produce an acid catalyst capable of initiating epoxy polymerization based on aryliodonium, arylsulfonium or aryldiazonium compounds. These include diphenyliodonium hexafluorophosphate and bis[4-(diphenylsulfonio)-phenyl]sulfide-bis-hexafluorophosphate.

A surfactant can be conveniently employed in the coating composition. Suitable surfactants include: Triton and X-100 from Rohm & Haas, Surfynol 104-E from Air Products, Aerosol OT from American Cyanamid, FC-120 from 3M, and Tergitol NP-27 from Union Carbide. It is preferred to use a silicone oil surfactant such as poly(dimethylsiloxane) to obtain superior stain and gloss protection.

The hard, epoxy/glass (inorganic/organic) coating composition is prepared by combining the acid-catalyzed hydrolysis product of either tetramethylorthosilicate (TMOS), tetraethylorthosilicate (TEOS) or tetrapropylorthosilicate (TPOS) with the acid-catalyzed hydrolysis product of an epoxy/silane coupling agent such as 3-glycidoxypropyltrimethoxysilane or 2-(3,4-epoxycyclohexyl)ethyltrimethoxysilane. The hydrolysis of thealkoxide and the coupling agent are carried out with stoichiometric amounts of 0.1% aqueous HCl solution. The liquor from the hydrolysis reaction is combined with a difunctional epoxy resin having at least one cycloaliphatic epoxide functionality such as 4-vinyl cyclohexenedioxide or an epoxy resin such as 3,4-epoxy-cyclohexylmethyl-3,4-epoxy cyclohexane carboxylate. An amount of arylonium salt capable of initiating the ring-opening, cationic photopolymerization of the epoxy resin is used as well as 0.25 weight percent of a surfactant base on poly(dimethylsiloxane). The combined ingredients are coated via a blade applicator, spray, or flood coating onto a substrate and dried to a slight tack state, U.V. cured using a dosage of typically 1.0–3.0 joules/cm$^2$, and in an optional step, heat cured at 250° F.

Generally the more basic the hydrolysis reaction, the larger the particle size in the aggregated gel that forms. When the particles reach sufficient size, they interfere with visible light and form opaque gels. If the pH of the reaction mixture is >7 the most likely result is a precipitated silica product. The gels are of high clarity and have the physical characteristic of behaving as though in a highly compressed, totally elastic state much like a "superball". The gel continues to densify with the evaporation of solvent until eventually reaching a glass state. Sol-gel processing of metal alkoxides is highly sensitive to stoichiometric factors during hydrolysis as well as the pH of the medium in which the hydrolysis condensation reaction is carried out.

Although the sol-gel process provides a route for the low-temperature conversion of metal alkoxides to glasses, the problems encountered during the drying stage after gel formation are formidable (volume changes of 8:1 are common). And although the sol-gel process is touted as a low-temperature route to glass formation, the temperature involved in transforming gels to glasses are almost always much higher than practical for a wear surface production process. Polymer/glass hybrids, however, can be designed to obtain their ultimate properties at suitable temperatures. It has been discovered that silica/epoxy hybrids can be processed at temperatures ranging from 125 to 400° F. Generally, the higher the processing temperature, the harder the final wear surface obtained.

Formulations particularly useful for the present invention contain four essential elements: (1) acid hydrolyzed silicon alkoxide, (2) acid hydrolyzed silicon alkoxide coupling agent, (3) difunctional, cycloaliphatic epoxy monomer, and (4) silicone surfactant. Total water content for the coating formulation is typically about 20% by weight. A coating is prepared from the formulation by any thin film application method, dried and exposed to U.V. or electron beam radiation. The resulting hybrid film consists of a chemically bonded glass phase and polymer phase as typified by the following reaction.

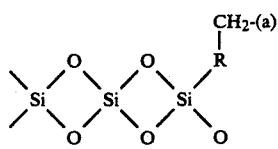

where R=epoxy, acrylate . . .

and a=multifunctional polymerizable monomer (epoxy, acrylate ...).

Polymer/glass hybrids have advantages over all glass systems in that they can be applied as relatively thick coatings (3-5 mils), require modest cure energy, and exhibit outstanding performance as wear surfaces in flooring applications. Coating thicknesses of 1-2 microns have proven to be especially outstanding in physical property tests when applied over flooring substrates.

INDUSTRIAL APPLICABILITY

The present invention advances building and flooring materials art by providing a hard wear surfaces with excellent stain and gloss protection which can be bonded over a relatively soft surface. Since these transparent polymer/glass (organic/inorganic) compositions can be applied over clear, protective layers, there can be a wide range of applications for a wear surface which will not detract from the appearance of the support or surface being protected.

The following examples illustrate the practice of the present invention.

PREPARATION AND TEST PROCEDURES

For safety considerations all preparatory work should be done in a hood. The tetraethylorthosilicate (TEOS) hydrolysis is carried out using a stoichiometric amount of water and is catalyzed by keeping the pH of the reaction mixture at about 2 (normally 1 or 2 drops conc. HCl in a batch size using 100 ml. TEOS). The coupling agent hydrolysis is carried out separately and also uses a stoichiometric amount of water (one drop conc. HCl catalyst per 50 ml. batch size). There is an exotherm observed in both hydrolysis reactions. After the hydrolysis reactions are completed, the coupling agent and TEOS solutions are stirred for at least 30 minutes. After this time, the two solutions are combined in a two to one weight ratio of TEOS solution to coupling agent solution. The epoxy and epoxy photoinitiator are added. The solution is mixed well for 15 minutes and is then ready for coating after addition of the silicone oil surfactant. If dilutions are to be made, they are done at this point with an 80/20 volume percent mixture of ethanol and water.

For test purposes, a tile or resilient substrate having a typical filled or unfilled PVC plastisol composition was prepared by applying a U.V. curable, clear, protective coating, usually ia a curtain-coater, at a thickness of 2-4 mils and cured via a dosage of 3 joules/cm2 U.V. The coated flooring structure was then given a spray or dip application of the invention sufficient to give a 1-2 micron dry thickness of the invention and subsequently exposed to U.V. radiation.

Stain protection was determined by comparing discoloration of control and invention test samples which were covered with various stain compositions and then wiped clean.

Trafficked samples were abraded with dirt for 30, 60 and 90 minutes and comparative gloss measurements were taken to determine the effectiveness of the protective surface. The % reduction from the initial gloss reading can be taken as an indication of surface wear.

| Example 1 | |
|---|---|
| Tetraethylorthosilicate (TEOS) | 98.4 g |
| 3-glycidoxypropyltrimethoxysilane (GPTMOS) | 55.0 g |
| ERL-4221 Epoxy Monomer | 10.0 g |

| -continued | |
|---|---|
| Example 1 | |
| FX-512 photoinitiator | 0.6 g |
| Water (Acidified w 0.19% con. HCl) | 46.0 g |
| Ethyl Alcohol (abs.) | 100 (ml.) |
| Poly(dimethylsiloxane) | 0.395 g |

The ingredient designated ERL-4221 and FX-512 are tradenames for the difunctional, cycloaliphatic epoxy monomer and arylonium salt and are marketed by Union Carbide and 3M Company, respectively The TEOS and 32.5 g water were combined in a beaker and let stir for 45 minutes. During this time, the GPTMOS was combined with 13.5 g water and stirred. After 45 minutes (or when the TEOS solution was clear), the TEOS and GPTMOS solutions were mixed and the remaining components were added as described above.

A coating of 1-2 micron final thickness was obtained by a 4:1 dilution with an 80/20 volume percent mixture of ethyl alcohol (abs.) and water followed by the spray application of approximately 1 ml wet of the diluted form of Example 1. After 5 minutes at 150° F. drying time, the coating was U.V. cured with a dose of 3 joules/cm2.

Table 1 and Table 2 contain comparative results for stain and gloss protection for the invention versus uncoated control tile.

TABLE 1

| Test Sample | 30 Min. % Gloss Retained | 60 Min. % Gloss Retained | 90 Min. % Gloss Retained |
|---|---|---|---|
| Control | 89 | 71 | 38 |
| Invention | 100 | 100 | 94 |

TABLE 2

| | Stain After Wiping | |
|---|---|---|
| Test Stain | Invention | Control |
| Blue Marker | None | None |
| Shoe Polish | None | Severe |
| Ink | None | Moderate |
| Hair Dye | None | Severe |
| Iodine | None | Severe |
| Driveway Sealer | None | Slight |

EXAMPLE 2

A formulation was prepared as in Example 1 except that 4-vinyl cyclohexene dioxide was used as the epoxy monomer and diphenyliodonium hexafluorophosphate was used as the photoinitiator. After U.V. exposure and heat curing at 250° F. for 30 minutes, a clear, hard, abrasive-resistant coating was produced which had excellent resistance to household stains similar to Table 2.

EXAMPLE 3

Coatings were prepared as in Example 1 except that tetramethylorthosilicate (TMOS) or tetrapropylorthosilicate (TPOS) were used to replace TEOS as the acid hydrolyzed silicate. After U.V. curing, the samples were heat cured at 250° F. for 30 minutes. These samples gave moderate stain versus severe stain for the control.

EXAMPLE 4

Coatings were prepared as in Example 1 except that a cycloaliphatic epoxy/silane coupling agent was used. The coupling agent, 2-(3,4-epoxycyclohexyl) ethyltrimethoxysilane, gave satisfactory coating compositions and was U.V. cured to produce satisfactory wear surfaces with properties similar to Tables 1 & 2 above.

EXAMPLE 5

A composition containing acrylate monomer was prepared as follows:

| Ingredient | Amount (g.) |
|---|---|
| Tetraethylorthosilicate (TEOS) | 2.5 |
| Hydroxypropylacrylate | 3.1 |
| Methacryloxypropyltrimethoxysilane | 2.5 |
| Pentaerythritoltriacrylate | 10 |
| Acidified Water (0.1% HCl) | 1.8 |
| Benzophenone | 0.15 |
| 2,2-dimethoxy-2-phenylacetophenone | 0.15 |
| DC-193 PDMS Surfactant | 1 drop |

As in Example 1, the TEOS and silane coupling agent were separately acid hydrolyzed before combination and addition of acrylate monomer, benzophenone photoinitiator and surfactant.

When coated and tested in comparison with the composition of Example 1, the acrylate composition gave stain and gloss protection better than a control, but not as good as an epoxy formulation. Results are shown in Table 3.

TABLE 3

| Sample | Stain Resistance | 90 Min. % Gloss Retained |
|---|---|---|
| Control no coating | Severe | 15% |
| Example 1 epoxy monomer | None | 94% |
| Example 5 acrylate monomer | Moderate to None | 74% |

EXAMPLE 6

Coating compositions were prepared and tested as in Example 1 except using a surfactant selected from: Triton ® X-100, Surfynol 104-E, Aerosol OT, FC-120, Tergitol NP-27. While a satisfactory wear surface was produced, these tests did not produce the superior stain and gloss protection of Examples 1 to 5 wherein a silicone surfactant was incorporated in the composition.

EXAMPLE 7

A coating composition was prepared and tested as in Example 1 except that a vinyl monomer, i.e. triethylene glycol divinyl ether, was substituted for the epoxy monomer. Fully equivalent wear and stain were obtained as illustrated in Tables 1 & 2.

EXAMPLE 8

Coating compositions were prepared and tested as in Example 1 except that portions of TEOS were replaced with triethylborate (TEB). Test samples were cured at 3 joules U.V. exposure. The coating compositions were examined over time to determine shelf life. Table 4 contains comparative results for stain and gloss retention.

TABLE 4

| TEOS | TEB | Age of Formulation | Dye Stain | % Gloss Retained |
|---|---|---|---|---|
| (Control) | | (Uncoated) | Severe | 30 |
| Example 1 | | 7 days | Formulation jelled | |
| 99.75 | 0.25 | 7 days | Slight | 99 |
| 99.5 | 0.5 | 7 days | Slight | 98 |
| 99 | 1.0 | 7 days | Moderate | 96 |
| 98.5 | 1.5 | 7 days | Moderate | 97 |

What is claimed is:

1. A floor covering comprising a polymer/glass hybrid wear layer and a resilient flooring substrate, said polymer/glass hybrid comprising an inorganic metal oxide glass modified with a coupling agent having an inorganic metal alkoxide functionality and an organic functionality.

2. The floor covering of claim 1, wherein the inorganic metal oxide glass is selected from the group consisting of aluminum oxide, zirconium oxide, silicon oxide and titanium oxide.

3. The floor covering of claim 1, wherein the resilient flooring substrate is vinyl-based.

4. The floor covering of claim 1 wherein the organic functionality of the coupling agent is selected from the group consisting of acrylates, methacrylates, epoxides and amino-functional moieties.

5. The floor covering of claim 4 wherein the coupling agent is a trialkoxysilane.

6. The floor covering of claim 1 wherein the inorganic metal alkoxide functionality of the coupling agent is selected from the group consisting of aluminum alkoxide, zirconium alkoxide, silicon alkoxide and titanium alkoxide.

7. The floor covering of claim 1 further comprising a protective layer interposed between the resilient flooring substrate and the polymer/glass hybrid wear layer.

8. The floor covering of claim 1 wherein the polymer/glass hybrid comprises a silicon oxide glass modified with an epoxy silane coupling agent.

9. A floor covering comprising a wear layer and a resilient flooring substrate, said wear layer comprising the reaction product of an acid-catalyzed hydrolysis product of an inorganic metal alkoxide and an acid-catalyzed hydrolysis product of a coupling agent having an inorganic metal alkoxide functionality and an organic functionality.

10. The floor covering of claim 9 wherein the inorganic metal alkoxide is selected from the group consisting of aluminum alkoxide, zirconium alkoxide, silicon alkoxide and titanium alkoxide.

11. The floor covering of claim 10 wherein the wear layer comprises on a weight basis the reaction product of
    (a) about 10 to about 70 percent acid-catalyzed hydrolysis product of at least one silicate selected from the group of tetramethylorthosilicate, tetraethylorthosilicate or tetrapropylorthosilicate;
    (b) about 1 to about 70 percent acid-catalyzed hydrolysis product of an epoxy/silane coupling agent;
    (c) about 1 to about 70 percent difunctional epoxy monomer having at least one cyclohexene oxide functionality; and
    (d) about 0.5 to about 10 percent photoinitiator capable of initiating ring-opening, cationic photopolymerization of (c).

12. The floor covering of claim 11 wherein (b) is 3-glycidoxypropyltrimethoxysilane.

13. The floor covering of claim 11 wherein (d) is a triphenylsulfonium salt.

14. The floor covering of claim 11 wherein (c) has the structure:

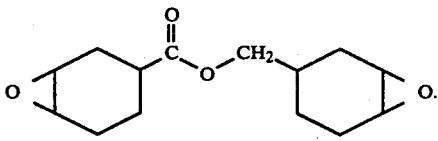

15. The floor covering of claim 10 wherein the inorganic metal alkoxide is selected from the group consisting of tetramethylorthosilicate, tetraethylorthosilicate and tetrapropylorthosilicate.

16. The floor covering of claim 9 wherein the inorganic functionality of the coupling agent is selected from the group consisting of aluminum alkoxide, zirconium alkoxide, silicon alkoxide and titanium alkoxide.

17. The floor covering of claim 9 wherein the organic functionality of the coupling agent is selected from the group consisting of acrylates, methacrylates, epoxides and amino-functionalities.

18. The floor covering of claim 9 wherein the wear layer comprises the reaction product of an acid-catalyzed hydrolysis product of an inorganic metal alkoxide, an acid-catalyzed product of a coupling agent having an inorganic metal alkoxide functionality and an organic functionality, and a multifunctional organic monomer.

19. The floor covering of claim 18 wherein the multifunctional organic monomer has functionalities selected from the group consisting of acrylates, methacrylates, epoxides and amino-functionalities.

20. The floor covering of claim 9 wherein the resilient flooring substrate is vinyl-based.

21. A floor covering comprising a wear layer and a vinyl-based resilient flooring substrate having a protective layer thereon, said wear layer comprising the reaction product of an acid-catalyzed hydrolysis product of a silicon alkoxide and an acid-catalyzed hydrolysis product of a silane coupling agent.

22. The floor covering of claim 21 wherein the silane coupling agent is an epoxy/silane.

23. The floor covering of claim 21 wherein the wear layer comprises the reaction product of an acid-catalyzed hydrolysis product of a silicon alkoxide, an acid catalyzed hydrolysis product of a silane coupling agent, and a multifunctional organic monomer.

24. The floor covering of claim 21 wherein the multifunctional organic monomer has functionalities selected from the group consisting of acrylates, methacrylates, epoxides and amino-functionalities.

* * * * *

UNITED STATES PATENT AND TRADEMARK OFFICE
CERTIFICATE OF CORRECTION

PATENT NO. : 5,023,140

DATED : June 11, 1991

INVENTOR(S) : Craig A. Glotfelter et al.

It is certified that error appears in the above-identified patent and that said Letters Patent is hereby corrected as shown below:

Column 3, line 14, the word "oxides" should read "alkoxides".

Column 7, line 49, the word "ia" should read "via".

Column 7, line 66, "98.4 g" should read "93.4 g".

Column 8, line 24, the word "ml" should read "mil".

Signed and Sealed this

Twenty-ninth Day of September, 1992

Attest:

DOUGLAS B. COMER

Attesting Officer    Acting Commissioner of Patents and Trademarks